Aug. 12, 1958   K. ARVANETAKIS ET AL   2,847,580
ROLL FILM HOLDER FOR RADIOGRAPHIC WORK
Filed Aug. 6, 1956   3 Sheets-Sheet 1
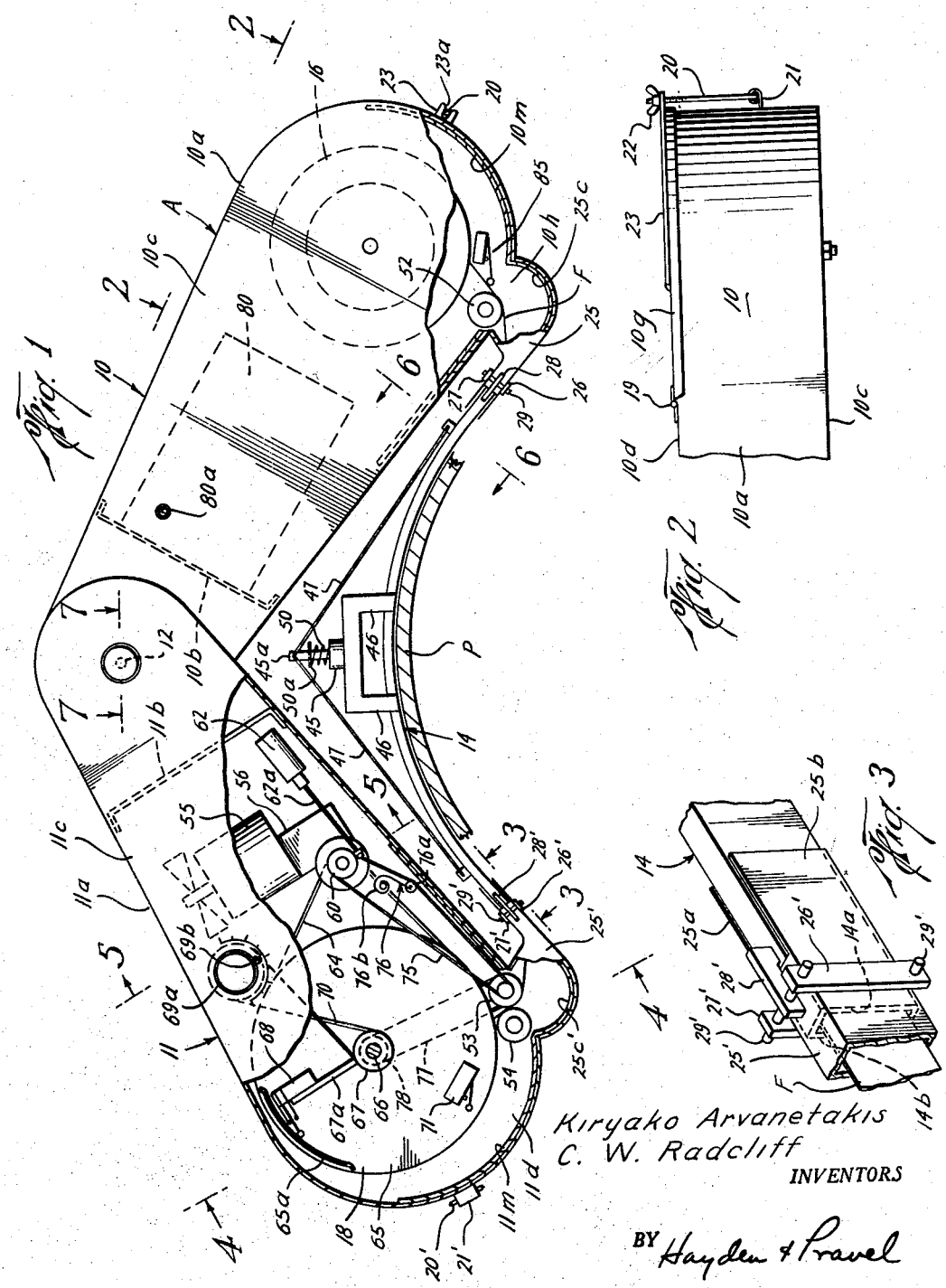
Kiryako Arvanetakis
C. W. Radcliff
INVENTORS
BY Hayden & Pravel
ATTORNEYS

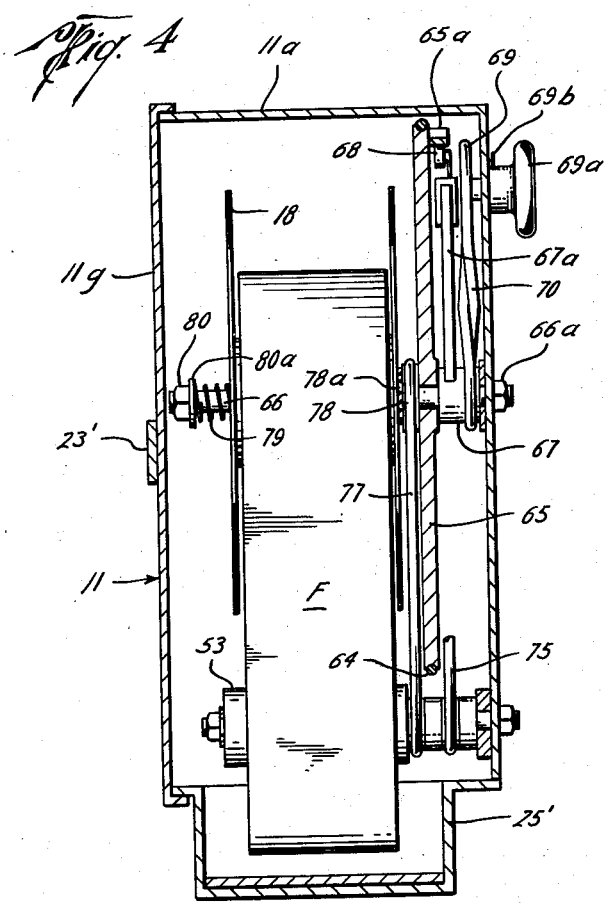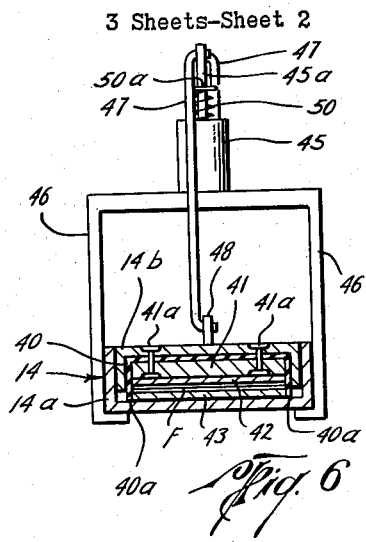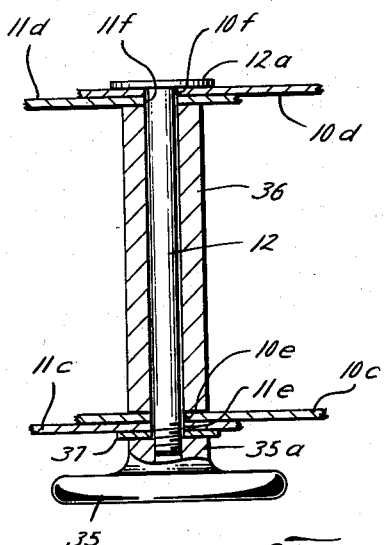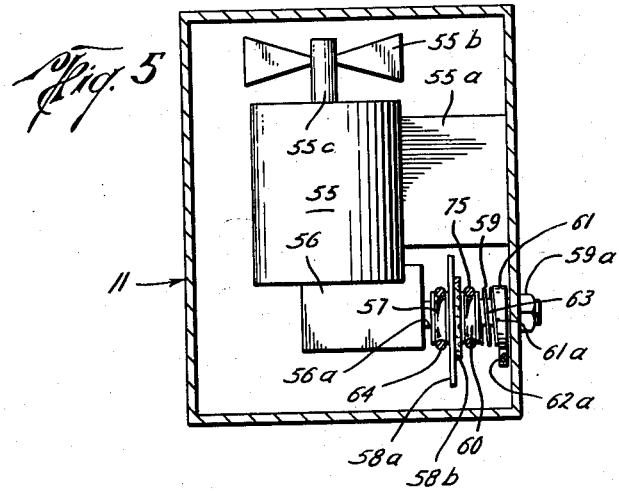

Aug. 12, 1958   K. ARVANETAKIS ET AL   2,847,580
ROLL FILM HOLDER FOR RADIOGRAPHIC WORK
Filed Aug. 6, 1956   3 Sheets-Sheet 3

Kiryako Arvanetakis
C. W. Radcliff
INVENTORS

BY Hayden & Pravel
ATTORNEYS

United States Patent Office 2,847,580
Patented Aug. 12, 1958

2,847,580

ROLL FILM HOLDER FOR RADIOGRAPHIC WORK

Kiryako Arvanetakis and Clarence W. Radcliff, Houston, Tex., assignors to Pipeline X-Ray Service, Houston, Tex., a corporation of Texas Application August 6, 1956, Serial No. 602,273

20 Claims. (Cl. 250—66)

This invention relates to film holders.

An object of this invention is to provide a new and improved roll film holder for use in industrial radiographic work.

An important object of this invention is to provide a new and improved roll film holder for use in the radiographic inspection of welds or the like in pipes, tanks or other objects.

Another object of this invention is to provide a new and improved roll film holder for industrial radiography which automatically moves the roll of film after each exposure so as to withdraw the exposed film from the exposure area and so as to also bring a new unexposed area of the film into the exposure area; the amount that such film is moved being variable within limits to facilitate the withdrawal of various lengths of the film when different lengths thereof are exposed.

A further object of this invention is to provide a new and improved roll film holder werein means are provided for supporting a portion of the roll of film in a curved position conforming with the external surface of a pipe, tank or other tubular body for close contact therewith.

Still another object of this invention is to provide a film holder for roll films, wherein said film holder has an adjusting means for positioning various selected lengths of the film in an exposure area provided in the holder, whereby the particular length of film in the exposure area may be selected in accordance with the size of each pipe or other tubular body with which the holder is used.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Fig. 1 is a view, partly in section and partly in elevation, illustrating the film holder of this invention in position for use with a tubular object.

Fig. 2 is a partial view in elevation taken on line 2—2 of Fig. 1.

Fig. 3 is an isometric view, showing a fragmentary portion of the device of Fig. 1 as taken on line 3—3 of Fig. 1.

Fig. 4 is a view, partly in elevation and partly in section, taken on line 4—4 of Fig. 1.

Fig. 5 is a view, partly in elevation and partly in section, taken on line 5—5 of Fig. 1.

Fig. 6 is a view, partly in elevation and partly in section, taken on line 6—6 of Fig. 1.

Fig. 7 is a view, partly in elevation and partly in section, taken on line 7—7 of Fig. 1.

Figure 8:
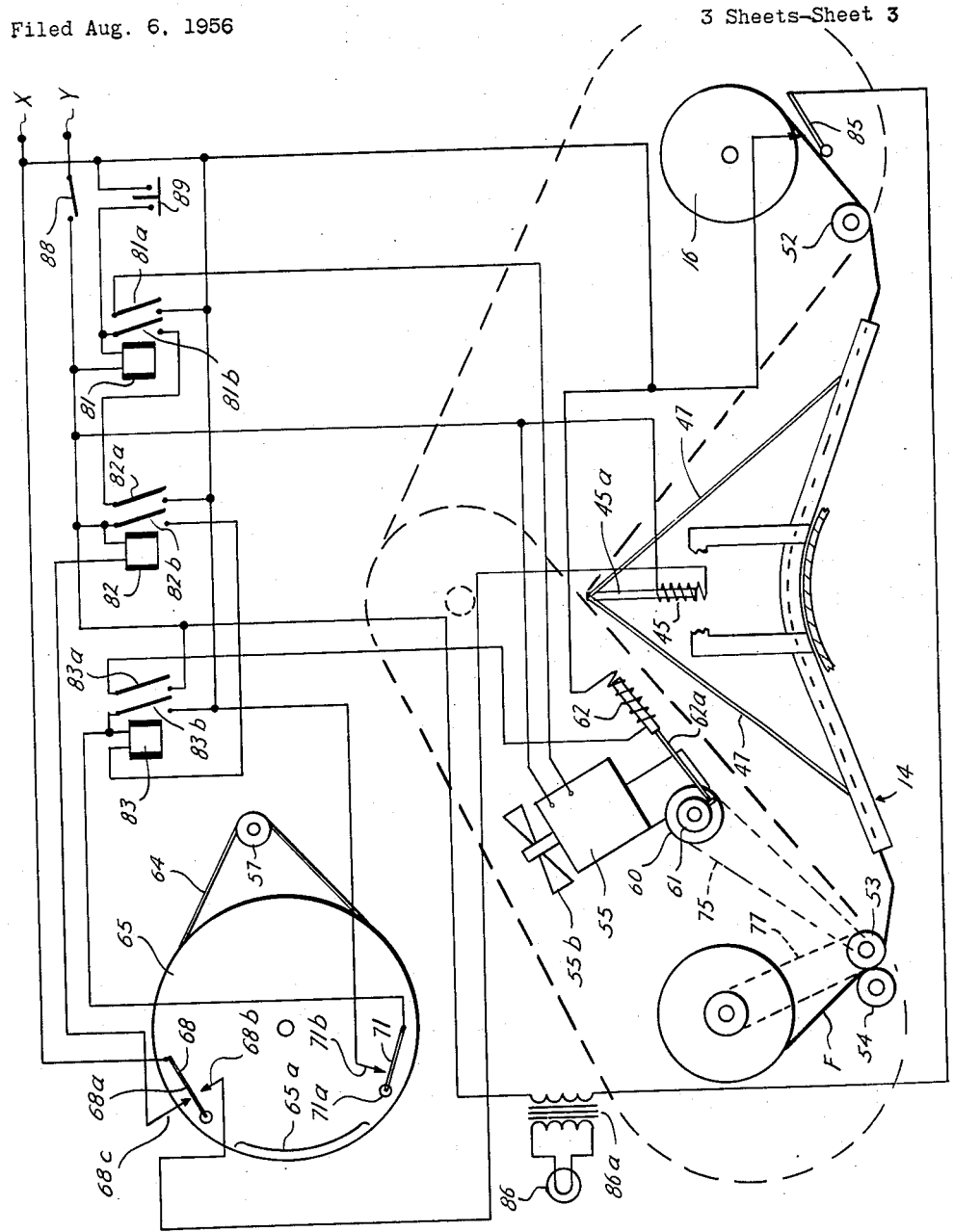
Fig. 8 is a schematic illustration of the electrical circuit which is preferably used with the holder of Fig. 1.

In the drawings, the letter A designates generally the roll film holder of this invention which is adapted to be used for X-ray or other radiographic work in connection with a pipe P (a portion of which is illustrated in Fig. 1) or other objects. Briefly, the holder A of this invention includes housing sections 10 and 11 which are pivotally and adjustably connected together at a pivot rod 12 (Fig. 7). A film guide housing 14 is mounted at the opposite ends of the housing 10 and 11 from the pivot rod 12 so that as the housings 10 and 11 are pivoted towards and away from each other about the pivot rod 12, the curvature of the flexible housing 14 is changed to conform with the external surfaces of pipe or other tubular objects of different diameters. A film F for radiographic work, preferably X-ray work, is fed from a film supply spool 16 through the film guide housing 14 and is wound up on a film take-up spool 18, as will be explained more in detail hereinafter. The guide housing 14 is constructed with an exposure area which extends for substantially the full length of the housing 14, although it may readily be varied in length as desired, so as to expose the film in such exposure area to X-ray from an X-ray tube, or similar rays used in radiographic work. As will be explained in detail, means are provided with the holder of this invention for winding up the length of the film F which is exposed in the exposure area for each exposure to the X-ray or similar rays used in radiographic work.

Considering the invention in detail, the housing section 10 is formed with a curved plate 10a (Fig. 2) which is welded or otherwise secured to a lateral end plate 10b (Fig. 1). A side housing plate 10c and another side housing plate 10d are joined or secured to the side plate 10a and the end plate 10b so as to form a complete enclosure or housing. The upper ends (as viewed in Fig. 1) of the housing plate 10c and the housing plate 10b extend beyond the lateral end plate 10b and they are provided with suitable openings 10e and 10f, respectively, through which the pivot pin 12 extends (Fig. 7).

At the other end of the housing 10 from the pivot pin 12, the housing section 10d is formed with a pivotal door section 10g which is hinged with a hinge 19 of standard construction for access to the interior of the housing 10. A fastener device of any suitable construction may be provided for holding the door section 10g in the closed position and for permitting access to the interior of the housing 10 when desired. As shown in Fig. 2, such a fastening means includes a threaded bolt 20 which is pivoted to a bracket 21 so as to swing towards and away from the housing 10. A wing nut 22 or other nut is threaded on the upper end of the threaded bolt 20 for positioning same above and in contact with a locking plate 23 which is welded or otherwise secured to the door section 10g to thereby hold the door section 10g in the closed position. The locking plate 23 has a notch 23a (Fig. 1) into which the upper end of the rod 20 is adapted to be removed prior to tightening the nut 22 on the bolt 20. Upon an unthreading of the nut 22, the rod 20 may be pivoted about the pivot provided by the bracket 21 (in a direction to the right as viewed in Fig. 2) to move the nut 22 from its position above the plate 23, and then the door section 10g can be pivoted about its hinge 19 for providing an opening into the housing 10.

The housing section 11 is constructed in substantially the same manner as described above in connection with the housing section 10. Thus, the housing section 11 has a curved plate 11a (Fig. 1) which has a laterally extending end plate 11b welded or otherwise secured thereto. Side housing plates 11c and 11d are also provided and they are secured to the plates 11a and 11b to form the housing enclosure. The upper ends (as viewed in Fig. 1) of the plates 11c and 11d extend beyond the plate 11b and are provided with suitable openings 11e and 11f through which the pivot pin or rod 12 extends (Fig. 7). A door section 11g (Fig. 4) is also provided and is suitably hinged (not shown) to the housing plate 11d in the same manner as described above in connection with the door section 10g. The releasable latching mechanism for the housing section 10 shown in Fig. 2 is also preferably utilized with the housing 11, and the parts thereof which are visible in Figs. 1 and 4 are identified with the same numerals used for the parts of the releasable latching mechanism for the housing 10, except that the numerals for the parts of the latch with the housing 11 are followed by a prime mark.

The film guide housing 14 extends between and is removably attached to the inner portions of the housing plates 10a and 11a. As illustrated in the drawings, an opening 10h is provided in the curved plate 10a and a film feed housing 25 is welded or otherwise secured to the side plate 10a so as to cover the opening 10h and so as to permit the film F to feed from the housing section 10 through the film feed housing 25 into the film guide housing 14. Thus, the film feed housing 25 is actually a part of the housing section 10 and forms a continuation thereof which is particularly suitable for connecting with the film guide housing 14. The film feed housing 25 has connecting brackets 26 and 27 welded or otherwise suitably secured thereto. The end of the housing 25 is open for receiving the film guide housing 14. Longitudinal flaps 25a and 25b are provided at the outer end of the feed housing 25 to permit the connecting bracket 28 to be releasably connected to the connecting brackets 26 and 27. When the openings in the connecting brackets 26, 27 and 28 are aligned with each other, a releasable connecting pin 29 such as a threaded bolt is positioned through such openings to thereby hold the film guide housing 14 connected to the film feed housing 25 with the end of the housing 14 extending into the housing 25. Preferably, the film guide housing 14 has upper and lower brackets 28 for connection with both the upper and lower openings in the brackets 26 and 27 by two of the pins 29 to assure a firm connection between the feed housing 25 and the film guide housing 14.

The opposite end of the film guide housing 14 is connected to a film feed housing 25' which is formed in the same manner as the film feed housing 25 except that it is reversed in its position so as to also have its open end facing towards the open end of the housing 25. The details of the connection of the left end of the film guide housing 14 (as viewed in Figs. 1 and 3) is best seen in Fig. 3. The film feed housing 25' has identical mounting brackets affixed thereto as described above in connection with the housing 25, and it includes the brackets 26' and 27' which are welded or otherwise secured to the housing 25'. Similarly, the left end of the film guide housing 14 has one or more connecting brackets 28' which are releasably connected to the brackets 26' and 27' by one or more of the connecting pins 29'. As is the case with the pins 29, such pins 29' also may be the usual bolt which has a nut at the other end thereof, or it may be any other type of releasable rod, so long as such rod may be removed for separating the film guide housing 14 from the film feed housing 25'. It should also be noted that the film feed housing 25' preferably has the same type of side flaps 25a and 25b which are provided with the film feed housing 25. With such arrangement, film guide housings 14 of different lengths may be readily connected to the film feed housing 25 and 25' so that the device of this invention may be used with pipes or other tubular objects having different diameters. Thus, the film guide housing 14 may flex within limits so as to conform with the external diameter of a range of sizes of the pipes or other tubular objects, but to provide for a wider or greater range of sizes of the pipes or other tubular objects which may be accommodated, film guide housings 14 of different lengths are used. The flexing of the particular film guide housing 14 which is in use is obtained by moving the housing sections 10 and 11 towards and away from each other about the pivot rod 12.

The housings 10 and 11 are locked in a selected position wherein the film guide housing 14 conforms with the external surface of the pipe P or other tubular object by a locking handle 35 which has an internally threaded nut section 35a formed therewith. Upon the rotation of the handle 35 relative to the threaded rod 12, the nut section 35a is threaded onto the rod 12 to move the rod 12 towards or away from the handle 35. The rod 12 has a washer or plate 12a welded or otherwise secured thereto which is positioned externally of the housing plate 10d (Fig. 7). A spacer sleeve 36 is positioned between the plates 10c and 11b to space same from each other. Also, a washer 37 is preferably provided on the external surface of the plate 11c and below the nut section 35a of handle 35. Thus, as the handle 35 is tightened on the threaded rod 12, the washer or plate 12a is moved in a direction toward the handle 35 which clamps the plates 10d and 11d tightly together between the plate 12a and the adjacent end of the spool 36. Similarly, the plates 10c and 11c are tightly clamped between the washer 37 and the other end of the spacer sleeve 36. Thus, the housings 10 and 11 are firmly locked against movement relative to each other and, therefore, the film guide housing 14 is locked in a particular shape or curvature which conforms with the pipe or tubular object being X-rayed.

The details of the film guide housing 14 are shown in Figs. 1 and 6, wherein the guide housing 14 is shown as including a channel member 14a and another channel member 14b slidably mounted in the channel member 14a. Thus, a longitudinal opening is provided between the channel members 14a and 14b which is in communication with the open ends of the film feed members or housings 25 and 25'. A channel shaped flexible member 40 which is formed of rubber or other resilient material has its ends 40a bonded or otherwise secured to the inner surface of the channel member 14a (Fig. 6), but such flexible member 40 extends within the other channel member 14b so that even though the channel members 14a and 14b slide relative to each other, a seal is provided to prevent the entry of light into the longitudinal space between such channel members 14a and 14b at all times. This is particularly important since the film F passes through the longitudinal space of the film guide housing 14 and it cannot be exposed to light. A lead strip 41 is positioned inwardly of the flexible member 40, and preferably rivets 41a or other securing means are utilized for holding the lead strip 41 and the flexible member 40 to the channel member 14b. An X-ray intensifier screen or strip 42 is secured to the lead strip 41 by adhesive or any other means which does not extend into contact with film F. A similar X-ray intensifier screen or strip 43 is secured to the other channel member 14a by adhesive or other suitable securing means which does not contact the film F. The screens 42 and 43 are separated from each other to provide a space therebetween through which the film F passes without contact with either of such screens 42 and 43, whereby scratching or other damage to the film F is prevented. However, during the exposure of the film F to X-ray or other rays used in radiographic work, the screens 42 and 43 are of course brought into contact with the film F.

In order to move the intensifier screens 42 and 43 relative to each other, a solenoid 45 is mounted on a bracket having four legs 46, all of which are connected to the channel member 14a only and are not connected to the channel member 14b. Such connection may be by welding or any other suitable attaching means. The solenoid 45 has its movable rod 45a pivotally connected to links or rods 47 which are also pivotally connected to the channel member 14b at brackets 48. A spring 50 urges the solenoid rod 45a of the solenoid 45 to its extended or outward position so that the channel member 14b is pulled away from the channel member 14a.

Under such conditions, there is a longitudinal space between the intensifier screens 42 and 43 through which the film F extends. When the solenoid 45 is actuated through the electrical circuit to be described, the rod 45a is pulled inwardly against the action of the spring 50 so as to move the rods 47 in a direction away from the solenoid 45 which causes the channel member 14b to move toward the channel member 14a and which in turn results in the intensifier screens 42 and 43 moving towards each other and into contact with both sides of the film F. The release of the electrical power to the solenoid 45 permits the spring 50 to again move the solenoid rod 45a away from the solenoid body 45 so as to again separate the intensifier screens 42 and 43 from each other and from their contact with the film F.

It should be noted that the coil spring 50 is illustrated as confined between the body of the solenoid 45 and a washer or pin 50a which is welded or otherwise secured to the movable solenoid rod 45a, whereby the spring 50 is compressed between the washer 50a and the body of the solenoid 45 when the rod 45 is moved inwardly.

After each exposure of the portion of the film in the exposure area of the film guide housing 14, the intensifier screens or plates 42 and 43 are separated from each other and the portion of the film which has been exposed is moved in a direction towards the take-up spool 18 so as to bring a new unexposed portion of film into the exposure area of the film guide housing 14. To this end, the film being used, such as X-ray film is initially wound upon the film supply spool 16 and is led over a guide roll 52 through the film guide housing 14 between the X-ray intensifier screens 42 and 43, then between the driven feed roller 53 and its companion co-acting idler feed roller 54. From the feed rollers 53 and 54, the film F is fed onto the take-up spool 18. It should be noted that all of the film F is protected from exposure to the X-ray by lead lining 10m in the housing 10, 25c in feed housing 25, 25'c in housing 25', and 11m in housing 11 except for the portion of the film F in the exposure area provided in the housing 14.

A motor 55 is mounted in the housing 11 on a base 55a (Fig. 5) for operation from a suitable source of electrical power. A fan 55b is mounted on one end of the motor shaft 55c so as to cause air circulation within the housing 11 which facilitates the separating of the screens or strips 42 and 43 from the film F during the separating action of the channel members 14a and 14b by the spring 50 as previously explained. A gear box 56 is connected to the motor shaft 55c at the other end thereof from the fan 55b, and through such gear box 56, a shaft 56a is driven, which has a driven pulley 57 mounted thereon for rotation with the shaft 56a. Thus, upon a rotation of the shaft 55c of the motor 55, the pulley 57 is rotated.

A clutch plate 58a is mounted on the shaft 56a for rotation therewith and it is adapted to co-act with a clutch plate 58b which is separately mounted therefrom on a shaft 59 which is attached to the housing 11 by threading in a nut 59a welded to the housing 11 or by other suitable attaching means. A pulley 60 is mounted on the shaft 59 for rotation relative thereto and with the clutch member 58b, so that when the clutch members 58a and 58b are in sufficient frictional engagement, the rotation of the shaft 56a is imparted from the clutch member 58a to the clutch member or plate 58b and therefore to the pulley 60. A cam arrangement including a cam member 61 which is rotatably mounted on the shaft 59 and which has an inclined cam or wedge surface 61a, is adapted to be turned by the operation of a solenoid 62 (Fig. 1). Such solenoid 62 has a solenoid rod 62a which moves upon the actuation of the solenoid 62 so that the cam 61 is turned relative to the shaft 59. Due to the wedge or inclined surface 61a of the cam 61, such turning results in a compression of a coil spring 63, and such compression urges the pulley 60 and the friction clutch plate 58b into a sufficient frictional contact with plate 58b into a sufficient frictional contact with plate 58a to cause the clutch members 58b and 58a to rotate together. Thus, the solenoid 62 controls the frictional contact between the clutch surfaces or plates 58a and 58b to thereby control the rotation of the pulley 60.

A drive belt 64 extends from the pulley 57 to a rotatable plate or disk 65 (Figs. 4 and 5). The rotatable disk or plate 65 is rotatably mounted upon a fixed shaft 66 which is rigidly connected with the housing 11 by threading in a nut 66a welded on the housing 11 or by any other suitable attaching means. A grooved pulley 67 is also rotatably mounted on the shaft 66. A switch arm 67a is welded or otherwise secured to the pulley sleeve 67 for movement therewith. Such arm 67a carries a micro-switch 68 at its outer end. For adjusting the position of the micro-switch 68, for a purpose to be hereinafter described, the pulley sleeve 67 is connected with a control pulley 69 by means of a flexible belt 70. The control pulley 69 has an externally mounted handle 69a with an outside pointer 69b connected therewith for indicating the relative position of the micro-switch 68 inside of the housing 11.

An arcuate shaped cam 65a is welded or otherwise secured to the rotatable disk or plate 65 for engagement with the micro-switch 68. The position of the micro-switch 68 determines the time at which such contact with the cam 65a occurs, and by varying the position of the switch 68, the time at which such switch 68 is actuated by the cam 65a is regulated. A second switch 71 is also mounted in the housing 11 (Fig. 1) for contact by the cam 65a. As will be explained in detail, the switch 71 is normally open, but upon contact by the cam 65a, such switch 71 is closed, and, therefore, the electrical circuit to the solenoid 62 is closed for connecting the clutch plates 58 and 58b in operative relationship for driving the pulley 60. The switch 68 serves to cut off the power to the solenoid 62 for stopping the drive of the pulley 60 and it also serves to actuate the solenoid 45, as will be explained.

When the pulley 60 is driven through the frictional engagement of the clutch plates 58a and 58b, such movement of the pulley 60 is transmitted to the feed roller 53 by a flexible belt 75 (Figs. 4 and 5). A spring tension member 76 having a roller 76a and a spring 76b is preferably used for maintaining the belt 76 under tension. Such is preferably accomplished by the contact of the roller 76a with the inside of the belt 75 to urge same outwardly and to hold same under tension by the pressure applied through the spring 76b.

The take-up spool 18 is driven simultaneously with the feed roll 53 by means of a flexible drive belt 77 which extends from the feed roller 53 to a rotatable pulley 78 mounted on the shaft 66. A friction disk 78a is secured to the pulley 78 and is rotatable about the shaft 66 with the pulley 78. Such friction disk 78a is in contact with the external surface of the spool 18 and is maintained in such frictional contact by a spring 79 which is held in place under compression by a nut 80 and washer 80a. Therefore, the movement of the roller 53 is transmitted through the belt drive 77 to the pulley 78 and the frictional disk 78a to the spool 18. However, although it is desirable for the take-up spool 18 to rotate simultaneously with the feed roller 53, it will also be appreciated that as the film F is wound up upon the spool 18, the diameter of the portion of the roll on the spool 18 gradually increases. Therefore, as the diameter of the film on the spool 18 increases, the spool 18 does not have to turn as rapidly as the roller 53 in order to wind up the same amount of film F as passes through the roller 53 for a given speed of such roller 53. Therefore, the film F is maintained tightly extended from the feed roller 53 to the spool 18 by the drive with the belt 77, but sufficient slippage is permitted at the friction disk 78a to prevent applying an excess of pressure to the film F.

An electrical control box 80 is preferably mounted within the housing 10. Such control box includes the electrical relays 81, 82 and 83 (Fig. 8) which are connected with a suitable source of electrical power (not shown) which is connected to the electrical terminals X and Y (Fig. 8). In Fig. 1, an electrical socket or plug 80a is illustrated for the connection of electrical wires to the source of electrical power, such as a 110 volt alternating current source. In addition to the electrical relay assembly 80 illustrated in Fig. 1, the housing 10 also includes another micro-switch 85 (Figs. 1 and 8) which is electrically connected with an indicator light 86 and its associated transformer 86a (Fig. 8) so that when all of the film has been fed from the film supply roll 16, such switch 85 closes to cause the light 86 to light up.

In the operation or use of the film holder A of this invention, it is placed in position on the external surface of the pipe P or other tubular object to be X-rayed or to be subjected to other rays for radiographic work. In the preferred form of the invention, the film guide housing 14 is curved as illustrated in Fig. 1 so as to be in close contact with the external surface of the pipe P or other tubular body; however, it is possible to use the invention herein described for flat or irregular shaped surfaces, as will be appreciated by those skilled in the art. In any event, assuming the guide housing 14 is in close contact with the object to be X-rayed or to be subjected to the rays for radiographic work, the portion of the X-ray film or the like which has been previously exposed in the exposure area of the film guide housing 14 is moved towards the take-up spool 18 so as to move an unexposed portion of film into the exposure area of the film guide housing 14. To accomplish such feeding of the film F, the master switch 88 (Fig. 8) and the button control switch 89 are closed. The button switch 89 may be operated manually, or it may be operated automatically by other machinery or remote equipment (not shown) connected with the switch 89. When the switches 88 and 89 are thus closed, the relay 81 is energized to close the relay arms 81a and 81b to thereby close the circuit to the motor 55. Upon the actuation of the motor 55, the rotatable plate or disk 65 is driven by the flexible belt 64 which extends from the pulley 57 to the plate 65 (Figs. 1, 4, 5 and 8). At the start of the cycle, electrical power is supplied to the solenoid 45 by the contact of the movable switch arm 68a with the fixed switch contact 68b, whereby the solenoid rod 45a is held inwardly, as previously explained, so as to hold the intensifier screens 42 and 43 in contact with the film F during the taking of the X-ray or other exposure to radiographic rays. However, when the rotatable disk 65 is turned by the closing of the relay 81, the cam 65a moves from the movable switch member 68a to open the circuit through the contact 68b and to close the electrical circuit through the contact 68c, which thereby closes the electrical circuit to the electrical relay 82. When the electrical relay 82 is closed, the relay arms 82a and 82b are closed which electrically locks the electrical relay 81 in a closed position so that the start button 89 may be released without discontinuing the operation of the motor 55. Since the motor 55 continues to operate, the rotatable disk or plate 65 continues to turn and ultimately the cam 65a contacts the movable member 71a of the switch 71 and brings it into contact with the fixed electrical contact 71b which closes the electrical circuit to relay 83. The closing of the electrical relay 83 closes the relay arms 83a and 83b to thereby close the electrical circuit to the clutch solenoid 62. The solenoid rod 62a is thus moved inwardly toward the solenoid 62 for turning the cam or wedge 61 on the shaft 59 for thereby compressing the spring 63 to cause the clutch plates 58a and 58b to frictionally engage each other for driving the pulley 60. Such driving of the pulley 60 causes the drive belt 75 to turn therewith for imparting rotation to the feed roller 53.

When the relay 83 closes it becomes locked electrically in its closed position so that even after the cam 65a moves past the clutch switch 71, the clutch solenoid 62 is maintained electrically connected in the circuit so that the clutch plates 58a and 58b remain in contact with each other, whereby the drive of the feed roller 53 continues even though the cam 65a passes the switch 71. Thus, the feeding of the film F continues from the time the switch 71 is closed by the cam 65a until the cam 65a hits the switch 68, at which time the movable switch arm 68a is moved out of contact with the electrical contact 68c and into contact with the electrical contact 68b. When the contact between the electrical contact 68c and the switch arm 68a is thus released, the relay arms 82a and 82b of the relay 82 are opened which thereby opens the circuits to the relays 81 and 83 so that the power to the electrical motor 55 is cut off. However, the electrical power to the electrical solenoid 45 is completed by the contact between the switch arm 68a and the electrical contact 68b so that the X-ray intensifier screens 42 and 43 are brought into close contact with the film F therebetween. Therefore, the film holder with the film F in the guide film portion 14 is ready to be used for taking an X-ray or for other radiographic work. After the X-ray or other radiographic work has been accomplished, the stop switch 89 may be again closed to repeat the above cycle of operation. It will be evident that such cycle of operation can be continuously repeated until the film F is fully exposed. The complete exposure of the film F is indicated when the switch 85 is closed, at which time the electric light 86 is turned on.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A roll film holder for radiographic work, comprising a film supply spool having a roll of film mounted thereon; a film take-up spool having an end of said roll of film connected thereto for receiving said film from said film supply spool, a flexible film guide housing extending between said supply spool and said take-up spool for guiding said film from said supply spool to said take-up spool, said film guide housing having an exposure area through which X-rays and the like may pass, and means to prevent X-rays and the like which are directed towards said exposure area from penetrating the film except in said exposure area.

2. The structure set forth in claim 1, including feed means for periodically feeding said film from said supply spool to said take-up spool, and means for turning said take-up spool simultaneously with such periodic feeding of said film to thereby wind up the film on the take-up spool as it is fed thereto from the supply spool.

3. The structure set forth in claim 1, including means to enclose said supply film spool and said take-up spool, said guide means also enclosing the portion of the film between said spools whereby the entire roll of film is completely enclosed against light.

4. The structure set forth in claim 1, including means for regulating the amount of said film fed to said take-up spool from said film supply spool for moving each exposed section of the film only out of said exposure area.

5. The structure set forth in claim 1, wherein said flexible guide means includes a first flexible channel member adapted to be curved for substantially conforming to the external surface of a tubular body, and a second flexible channel member mounted with said first channel member to form an enclosed longitudinal passage therebetween, with said film extending through said longitudinal passage between said channel members.

6. The structure set forth in claim 1, wherein said flexible guide means includes a first flexible channel member adapted to be curved for substantially conforming to the external surface of a tubular body, a second flexible channel member mounted with said first channel member to form an enclosed longitudinal passage therebetween, with said film extending through said longitudinal passage between said channel members, an intensifier strip mounted inside of each of said channel members on each side of said film, said flexible channel members being laterally movable towards and away from each other to move the intensifier strips towards and away from each other, and means to move said channel members laterally to move said intensifiers into contact with the film therebetween when it is desired to expose same to X-ray or the like.

7. A roll film holder comprising, a first housing, a film supply spool mounted in said first housing, a second housing, a film take-up spool mounted in said second housing, means pivotally connecting one end of said first housing to one end of said second housing, said first housing having a film feed opening near the other end thereof, said second housing also having a film feed opening near the other end thereof, and a flexible film guide housing extending from the film feed opening in said first housing to the film feed opening in said second housing for guiding the film from said film supply spool to said film take-up spool and for flexing to conform at least a portion of the film in the guide housing to the external curved surface of a tubular object, said film guide housing having an exposure area through which X-rays and the like may pass, and means to prevent X-rays and the like which are directed towards said exposure area from penetrating the film except in said exposure area.

8. The structure set forth in claim 7, including means to lock the pivotal connection between said first and second housings to retain same in a selected position with respect to each other, whereby said flexible guide housing is also held in a selected substantially arcuate position.

9. The structure set forth in claim 7, including means for removably attaching said flexible guide housing to said first and second housings whereby flexible guide housings of different lengths may be used for accommodating wide variations in the external curvatures of said tubular object.

10. The structure set forth in claim 7, including a metering means for winding up on said take-up spool only such amount of said film in said guide housing as is exposed to radio graphic rays.

11. The structure set forth in claim 7, including an intensifier plate on each side of said film in said housing, means for moving said plates into contact with each side of said film for the subsequent exposure of said film, and means for moving said plates out of contact with said film for permitting longitudinal movement of said film relative to said plates without scratching or otherwise damaging said film.

12. The structure set forth in claim 7, including a metering means for winding up on said take-up spool only such amount of said film in said guide housing as is exposed to radiographic rays, and means for adjusting said metering means for winding up various selected amounts of said film in accordance with the amount of the film which is exposed.

13. The structure set forth in claim 7, including a metering disk, power means for driving said metering disk, film feed means for feeding the film, a releasable connecting means for selectively connecting said power means with said film feed means, and means operable by said metering disk for disconnecting said releasable connecting means for thereby regulating the length of film fed by said film feed means during each film feeding period.

14. The structure set forth in claim 7, including a metering disk, power means for driving said metering disk, film feed means for feeding the film, a releasable connecting means for selectively connecting said power means with said film feed means, means operable by said metering disk for disconnecting said releasable connecting means for thereby regulating the length of film fed by said film feed means during each film feeding period, and means connecting said feed means with said take-up spool for winding up the film only as it is fed by the feed means to the take-up spool.

15. The structure set forth in claim 7, wherein said flexible guide housing includes a first channel member, and a second flexible channel member mounted with said first channel member to form an enclosed longitudinal passage therebetween, with said film extending through said longitudinal passage between said channel members.

16. In a roll film holder, a film metering assembly comprising, a metering disk, power means for driving said metering disk, film feed means for feeding the film, a releasable connecting means for selectively connecting said power means with said film feed means, and means operable by said metering disk for disconnecting said releasable connecting means for thereby regulating the length of film fed by said film feed means during each film feeding period.

17. The structure set forth in claim 16, including means to reconnect said releasable connecting means for beginning another film feeding period.

18. The structure set forth in claim 16, wherein said releasable connecting means includes a friction clutch positioned between said power means and said film feed means.

19. In a roll film holder having a feed roller for feeding film from a roll of film, a power means for driving said feed roller, and a clutch for operatively connecting and disconnecting said power means with said feed roller, a film metering assembly comprising, a metering disk, means connecting said power means with said metering disk for driving same, a cam on said metering disk, a first electrical means operable upon engagement by said cam for engaging said clutch to connect said power means with said feed roller for thereby feeding film from said roll of film, and a second electrical means operable by said cam for disengaging said clutch to disconnect said power means from said feed roller to thereby stop the feeding of said film.

20. The structure set forth in claim 19, intensifier screens on each side of a portion of said film for radiographic work, means for moving said screens towards each other and into contact with said portion of said film, and a third electrical means operable by said cam substantially simultaneously with the operation of said second electrical means for operating said means for moving said intensifier screens into contact with said portion of the film for radiographic work.

References Cited in the file of this patent

UNITED STATES PATENTS

| 1,536,335 | Folmer | May 25, 1925 |
| 2,381,556 | Powers | Aug. 7, 1945 |